US012013933B2

(12) United States Patent
Duttachoudhury et al.

(10) Patent No.: US 12,013,933 B2
(45) Date of Patent: *Jun. 18, 2024

(54) ENHANCING SECURITY USING ANOMALY DETECTION

(71) Applicant: Microsoft Technology Licensing, LLC, Redmond, WA (US)

(72) Inventors: Nayantara Duttachoudhury, Bellevue, WA (US); Kevin Lo, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 570 days.

This patent is subject to a terminal disclaimer.

(21) Appl. No.: 17/237,150

(22) Filed: Apr. 22, 2021

(65) Prior Publication Data

US 2021/0312040 A1 Oct. 7, 2021

Related U.S. Application Data

(63) Continuation of application No. 16/058,309, filed on Aug. 8, 2018, now Pat. No. 11,017,076.

(51) Int. Cl.
*G06F 21/55* (2013.01)
*G06N 20/00* (2019.01)
*H04L 9/32* (2006.01)

(52) U.S. Cl.
CPC .......... *G06F 21/552* (2013.01); *G06F 21/554* (2013.01); *G06N 20/00* (2019.01); *G06F 2221/034* (2013.01); *H04L 9/3268* (2013.01)

(58) Field of Classification Search
None
See application file for complete search history.

(56) References Cited

U.S. PATENT DOCUMENTS

| | | | |
|---|---|---|---|
| 8,161,547 B1 * | 4/2012 | Jennings | H04L 63/1441 726/22 |
| 9,740,859 B2 * | 8/2017 | Harris | H04L 63/02 |
| 10,375,095 B1 * | 8/2019 | Turcotte | H04L 63/1425 |
| 10,769,267 B1 * | 9/2020 | Li | G06F 21/316 |
| 10,878,428 B1 * | 12/2020 | Comeaux | G06Q 30/0185 |
| 2016/0373262 A1 * | 12/2016 | Shearer | H04L 9/3263 |

(Continued)

FOREIGN PATENT DOCUMENTS

| | | |
|---|---|---|
| CN | 101038612 A | 9/2007 |
| CN | 103299594 A | 9/2013 |

(Continued)

OTHER PUBLICATIONS

"Second Office Action Issued in Chinese Patent Application No. 201980053143.X", Mailed Date: Feb. 22, 2023, 15 Pages.

(Continued)

*Primary Examiner* — Christopher C Harris
(74) *Attorney, Agent, or Firm* — Christopher J. Volkmann; Kelly, Holt & Christenson, PLLC.

(57) ABSTRACT

Certificate usage data is generated which identifies which processes or applications use which specific certificates. A certificate-specific usage model is generated based upon the certificate usage data and is used to detect anomalous usage of a certificate, by an application or process that has not previously used the certificate to authenticate itself to the computing system.

20 Claims, 9 Drawing Sheets

(56) References Cited

U.S. PATENT DOCUMENTS

2017/0126710 A1\* 5/2017 De-Levie ............ H04L 63/1425
2018/0124082 A1\* 5/2018 Siadati ................ H04L 63/1425

FOREIGN PATENT DOCUMENTS

CN 105052108 A 11/2015
CN 107278306 A 10/2017

OTHER PUBLICATIONS

"First Office Action and Search Report Issued in Chinese Patent Application No. 201980053143.X", Mailed Date: Sep. 15, 2022, 15 Pages.
"First Office Action Issued in Indian Patent Application No. 202047057292", Mailed Date: Oct. 7, 2022, 6 Pages.
Intention to grant Received for European Application No. 19737640.3. mailed on Dec. 6, 2023, 7 pages.
U.S. Appl. No. 16/058,309, filed Aug. 8, 2018.
"Notice of Allowance Issued in China Patent Application No. 201980053143.X", Mailed Date: May 11, 2023, 4 Pages.
Decision to grant a European patent pursuant to Article 97(1) EPC, Received for European Application No. 19737640.3, mailed on Apr. 18, 2024, 02 pages.

\* cited by examiner

US 12,013,933 B2

ENHANCING SECURITY USING ANOMALY DETECTION

CROSS-REFERENCE TO RELATED APPLICATION

The present application is a continuation of and claims priority of U.S. patent application Ser. No. 16/058,309, filed Aug. 8, 2018, the content of which is hereby incorporated by reference in its entirety.

BACKGROUND

Computing systems are currently in wide use. Some computing systems include data centers. Others include host computing systems that host services that are accessed by users or other computing systems.

In such computing systems, it is not uncommon for an application or process to use a certificate to authenticate itself to the computing system so that it can execute operations on the computing system. A certificate is an electronic document used to prove ownership of a public key. The computing system examines the certificate to determine whether it trusts the certificate issuer. If so, it can use the key to communicate securely with the application or process.

Problems can occur, however. If a certificate is stolen or copied or otherwise obtained maliciously, then a malicious actor that obtained the certificate can authenticate any process or application in any environments where the certificate is valid.

The discussion above is merely provided for general background information and is not intended to be used as an aid in determining the scope of the claimed subject matter.

SUMMARY

Certificate usage data is generated which identifies which processes or applications use which specific certificates. A certificate-specific usage model is generated based upon the certificate usage data and is used to detect anomalous usage of a certificate, by an application or process that has not previously used the certificate to authenticate itself to the computing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
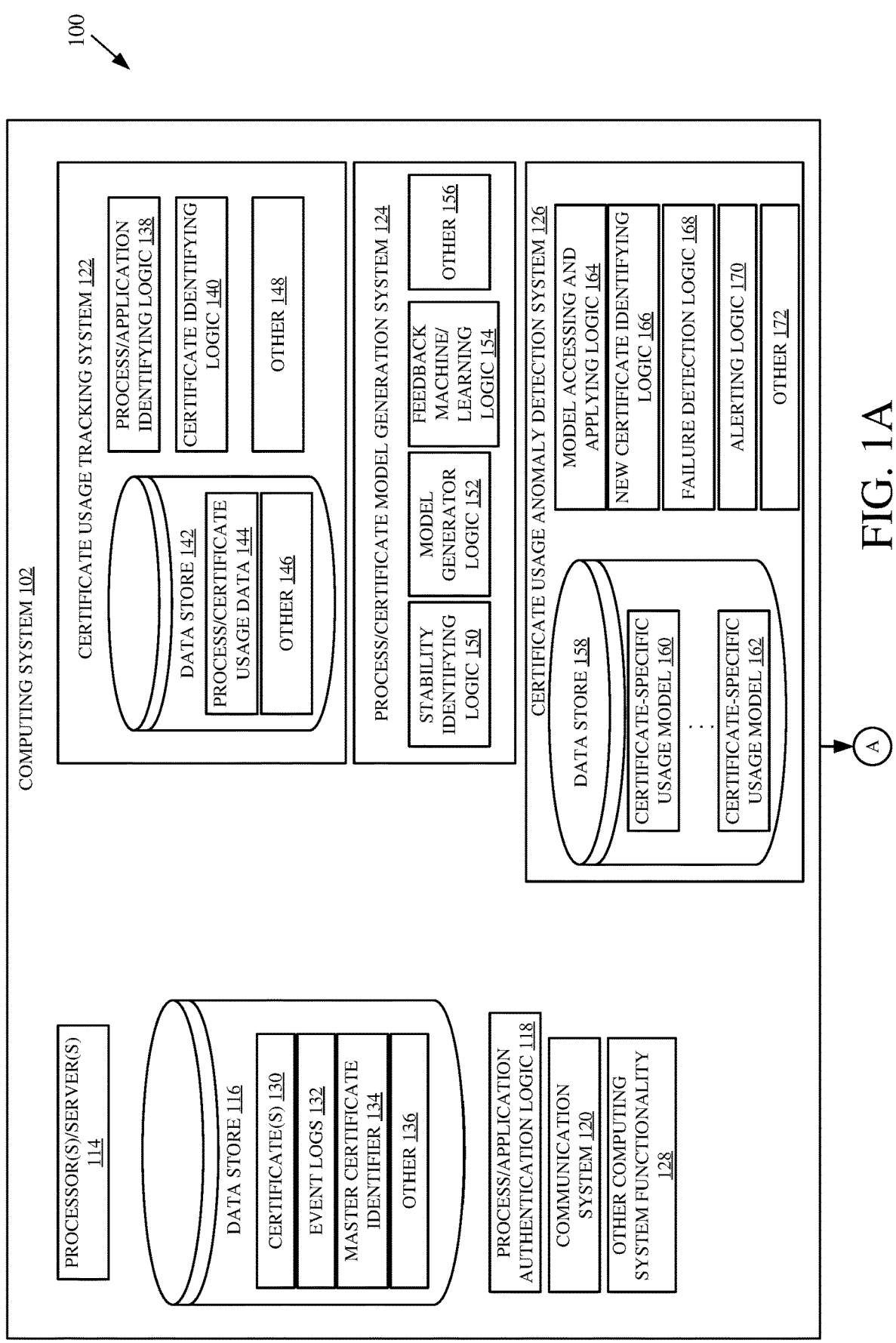
FIGS. 1A and 1B (collectively referred to herein as FIG. 1) show a block diagram of one example of a computing system architecture.
Figure 1B:
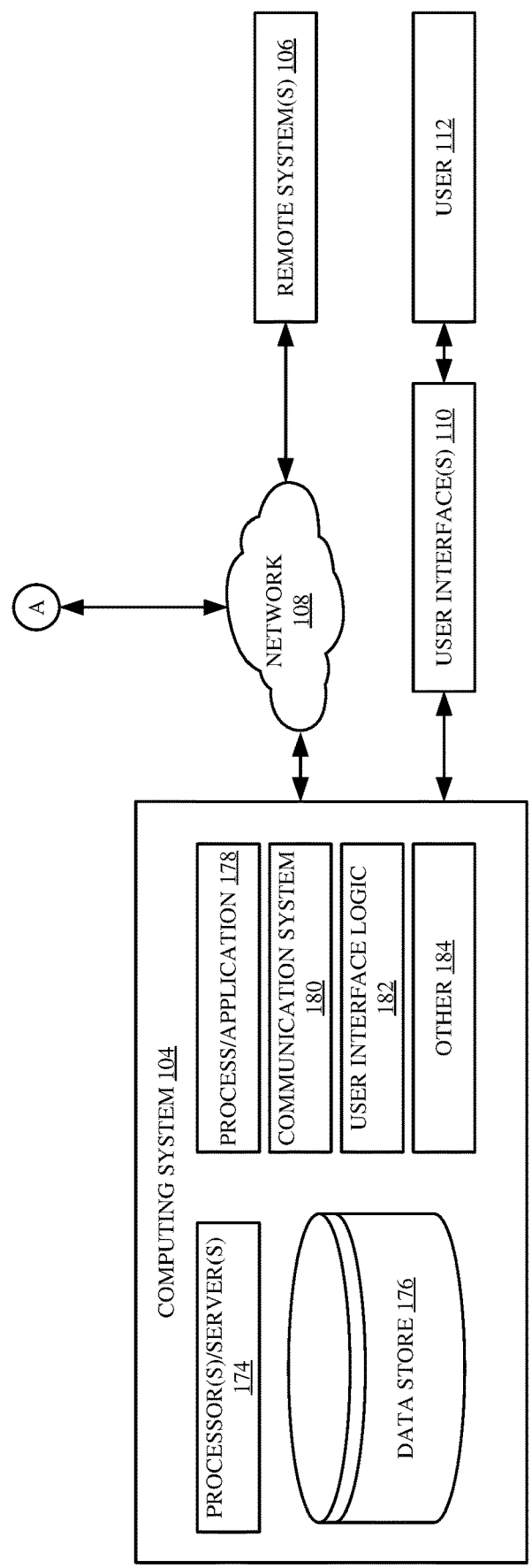

FIGS. 1A and 1B (collectively referred to herein as FIG. 1) show a block diagram of one example of a computing system architecture 100. Architecture 100 illustratively includes computing systems 102 and 104, and one or more remote systems 106. Those items can communicate with one another either directly or over network 108. Network 108 can be any of a wide variety of different types of networks, such as a wide area network, a local area network, a near field communication network, a cellular communication network, or any of a wide variety of other networks or combinations of networks.

FIG. 1 also shows that, in one example, computing system 104 generates user interfaces 110 for interaction by user 112. User 112 can interact with user interfaces 110 in order to control and manipulate computing system 104 and some portions of computing system 102.

Also, in the examples shown in FIG. 1, computing system 102 can be a data center or a host computing system that hosts a service that can be accessed by computing system 104. Thus, computing system 104 can include processes or applications that authenticate themselves to computing system 102 in order to execute on computing system 102 or to perform certain processing steps or interactions with computing system 102. Computing system 102 thus tracks which processes or applications authenticate themselves to computing system 102 with which specific certificates and generates a model based upon that information. It uses that model to detect any anomalies in the processes or applications that attempt to authenticate themselves to computing system 102 with the various certificates that are valid within computing system 102.

Before describing the overall operation of architecture 100 in more detail, a brief description of some of the items in architecture 100, and their operation, will first be provided.

Computing system 102 illustratively includes processors or servers 114, data store 116, process/application authentication logic 118, communication system 120, certificate usage tracking system 122, process/certificate model generation system 124, certificate usage anomaly detection system 126 and it can include a wide variety of other computing system functionality 128. Data store 116, itself, illustratively includes certificates 130 that are valid on the machine that is running computing system 102. Data store 116 can also include event logs 132 that log various events performed on computing system 102 and it can include master certificate identifier 134 as well as other items 136. Master certificate identifier 134 is illustratively a master file that identifies all of the certificates 130 that are valid on the machine executing computing system 102. Therefore, each of the certificates 130 should be identified in master certificate identifier 134. If a certificate 130 is stored on data store 116, but it is not included in the master certificate identifier 134, then this may indicate that the certificate was maliciously placed on the machine. This is described in greater detail below.

Process/application authentication logic 118 illustratively executes the steps in authenticating an application or process that is attempting to run on computing system 102. Therefore, it receives an identification of the certificate that the application or process is attempting to use to authenticate itself to logic 118. It examines that certificate and, if valid, uses a corresponding key to communicate with the application or process. The terms application and process refer to code or logic that attempts to authenticate itself to computing system 102 and run on (or execute operations on) computing system 102. These terms will be used interchangeably herein.

Communication system 120 illustratively allows items in computing system 102 to communicate with one another and it allows computing system 102 to communicate with computing system 104 and remote systems 106. Therefore, communication system 120 may vary depending on the type of network 108 over which it is to communicate.

Certificate usage tracking system 122 illustratively includes process/application identifying logic 138, certificate identifying logic 140, data store 142 (which, itself, includes process/certificate usage data 144 and can include other items 146), and certificate usage tracking system 122 can also include other items or functionality 148. Certificate usage tracking system 122 tracks which particular processes or applications are authenticating themselves to computing system 102 with which particular certificates 130. Therefore, when an application attempts to authenticate itself using logic 118 with a particular certificate 130, process/application identifying logic 138 identifies the application that is using that certificate and certificate identifying logic 140 identifies the particular certificate 130 that the process or application is using. It then stores the process/certificate usage data 144 in data store 142. This data identifies which processes or applications are using which certificates to authenticate to computing system 102.

In another example, certificate usage tracking system 122 can access event logs 132. Event logs 132 illustratively identify which processes or applications have authenticated themselves to computing system 102 using which particular certificates 130. Therefore, tracking system 122 can track real time or near real time information in which processes or applications are authenticating themselves to computing system 102 using various certificates 130. It can also process the event logs 132 which contain historical data indicating which particular processes or applications have authenticated themselves to computing system 102 using which particular certificates. These and other techniques can be used to by system 112 in order to generate the process/certificate usage data 144.

Process/certificate model generation system 124 then generates a certificate usage model based upon the process/certificate usage data 144. In one example, process/certificate model generation system 124 includes stability identifying logic 150, model generator logic 152, feedback/machine learning logic 154, and it can include a wide variety of other information 156. Stability identifying logic 150 identifies when the process/certificate usage data 144 has stabilized so that a stable model can be generated. For instance, given a sufficient data collection time period, the various applications or processes which use a particular certificate to authenticate themselves to computing system 102 will stabilize (meaning that it will remain unchanged for a threshold time period, or that it will change vary slowly over that time period). Once the data has stabilized, so that a stable process/certificate usage model can be generated, then model generator logic 152 generates a model representing the usage of a particular certificate 130. The model will illustratively represent which processes or applications use that certificate to authenticate themselves to computing system 102, or which processes or applications normally use that certificate. The model can represent the usage data in other ways as well. The certificate-specific usage model is then output to certificate usage anomaly detection system 126.

Feedback/machine learning logic 154 is used when anomalous usage of a certificate is detected. It is provided with feedback information indicating whether that detection was accurate or inaccurate. The feedback can be user input feedback or it can be automatically generated. It then uses that feedback information to enhance the accuracy of the operation of stability identifying logic 150 and model generator logic 152 so that the certificate-specific usage models are more accurate as well.

Certificate usage anomaly detection system 126 illustratively includes data store 158 (which, itself, illustratively includes a plurality of certificate-specific usage models 160-162 where a particular model corresponds to each certificate 130), model accessing and applying logic 164, new certificate identifying logic 166, authentication failure detection logic 168, alerting logic 170, and it can include other items 172.

The certificate-specific usage models 160-162 are illustratively models generated (as discussed above) by system 124 for each specific certificate 130. They represent the usage of the corresponding certificate so that the applications or processes that have been used to access that certificate in authenticating themselves to computing system 102 are identified and represented in that model.

Model accessing and applying logic 164 illustratively receives an indication that a process or application is attempting to use a particular certificate 130 to authenticate itself to computing system 102, using authentication logic 118. It then accesses the certificate-specific usage model 160-162, for that particular certificate 130, and applies the model to determine whether this is an anomalous usage of the certificate. For instance, using the certificate-specific usage model for the certificate, it determines whether the current process or application has ever used this certificate to successfully authenticate itself to computing system 102 before. It not, then it generates a certificate usage anomaly signal indicating that this is an anomalous usage of the certificate.

In one example, anomalies can be identified in other ways as well. New certificate identifying logic 166 also receives the indication that a process or application is using a certificate 130 to authenticate itself to computing system 102. It accesses master certificate identifier 134 to determine whether the certificate that is being used is identified in master certificate identifier 134 (meaning that it is a certificate that is supposed to reside on this machine and be used for authentication). If not, then this indicates that a new certificate 130 has been added to data store 116, but it is not included in the master certificate identifier 134, and this may be identified as an anomalous usage. This may represent a scenario in which a malicious actor has somehow generated a certificate and placed it in data store 116 so that it can be used to execute malicious processes or applications on computing system 102. Thus, a new certificate anomaly signal is generated by logic 166 indicating this.

Authentication failure detection logic 168 receives a signal from process/application authentication logic 118 indicating that a process or application has attempted to use a certificate 130 to authenticate itself to computing system 102, but that authentication attempt has failed. This can indicate anomalous usage as well. By way of example, if a particular process or application repeatedly attempts to authenticate itself to computing system 102 using a particular certificate 130, or a plurality of different certificates 130, this may indicate that a malicious actor is attempting to gain access to computing system 102. This repeated authentication failure is detected by authentication failure detection logic 168 and can be used to identify malicious or anomalous activity. Logic 168 thus generates an authentication failure anomaly signal indicating this.

Alerting logic 170 receives signals from logic 164, 166 and 168, when anomalous usage activity is detected, and it generates an alert. The alerts can all be generated with a same urgency or they can be ranked based upon the type of anomalous usage that was detected. Alerting logic 170 can then use communication system 120 to communicate that alert in a desired way. For instance, it can generate an automated phone call or cellular communication to security personnel who can attempt to investigate or stop the anomalous usage. It can take automatic corrective or remediation action to remedy the anomalous usage, such as to block the process or application that is attempting to authenticate or that is executing on computing system 102. It can generate an electronic mail message or a text message, or generate different alerts and send them to different entities, based upon the urgency of the alert, based upon the type of anomalous usage detected, or in a wide variety of other ways.

Computing system 104 illustratively includes one or more processors or servers 174, data store 176, a process or application 178, communication system 180, user interface logic 182, and it can include a wide variety of other computing system functionality 184. Process or application 178 is illustratively a process or application that accesses computing system 102 and attempts to authenticate itself using authentication logic 118, with a particular certificate 130, so that it can execute or perform operations on computing system 102.

Communication system 180 illustratively allows items in computing system 104 to communicate with one another and to communicate with computing system 102 over network 108. User interface logic 182 illustratively generates user interfaces 110 and detects user interactions with those user interfaces 110. It communicates an indication of the user interactions to other items on computing system 104 and or computing system 102.

Figure 2:
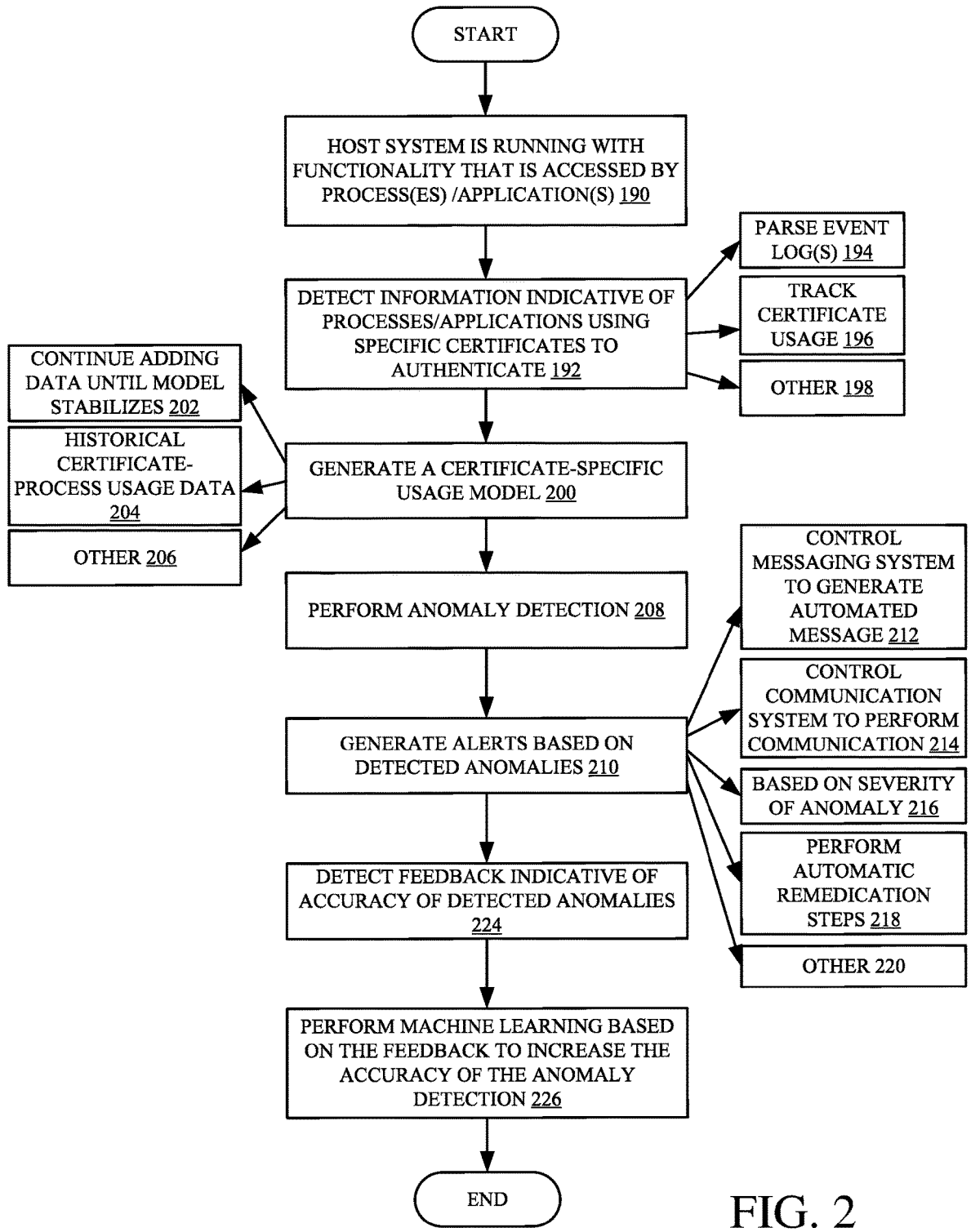
FIG. 2 is a flow diagram illustrating one example of the overall operation of the architecture illustrated in FIG. 1 in generating and using a certificate-specific usage model to detect anomalous usage of a certificate.

FIG. 2 is a flow diagram illustrating one example of the operation of architecture 100, in more detail. It is first assumed that the host system 102 is running with functionality that is accessed by a process or application in order to execute or perform operations on computing system 102. This is indicated by block 190 in the flow diagram of FIG. 2.

Certificate usage tracking system 122 then detects information indicative of a process or application using a specific certificate 130 to authenticate itself to computing system 102. This is indicated by block 192. In one example, system 122 parses event logs 132 to identify this type of process/certificate usage data 144. This is indicated by block 194 in the flow diagram of FIG. 2. In another example, process/application identifying logic 138 and certificate identifying logic 140 tracks certificate usage in real time, or near real time, in order to generate the process/certificate usage data 144. Tracking certificate usage in this way is indicated by block 196 in the flow diagram of FIG. 2. The information indicative of the process/application usage of specific certificates can be done in other ways as well, and this is indicated by block 198.

Process/certificate model generation system 124 then generates a certificate-specific usage model based upon the usage information. This is indicated by block 200. In one example, stability identifying logic 150 controls system 124 to continue to add usage data until the model or data stabilizes. This is indicated by block 202. Model generator logic 152 then generates a model indicative of the historic certificate-process usage data, and representing which processes or applications used which certificates to authenticate themselves to computing system 102. This is indicated by block 204. The model can be generated in other ways as well, and this is indicated by block 206. Once the certificate-specific usage model is provided to certificate usage anomaly detection system 126, system 126 performs anomaly detection. This is indicated by block 208. Some examples of anomaly detection were described above, and some are described below with respect to FIG. 3, in more detail.

When an anomaly is detected, then alerting logic 170 generates alerts based on the detected anomalies. This is indicated by block 210. For instance, it can control communication system 120 to send an automated message to a particular entity or group of entities. This is indicated by block 212. It can control communication system 120 to perform other communication as discussed above. This is indicated by block 214. The type of alert can be based on the severity or ranking level of the anomaly detected. This is indicated by block 216. Alerting logic 170 can, itself, or using other computing system functionality 128, perform automatic remediation steps to remediate the anomalous usage. This is indicated by block 218. For instance, it can block the process or application from executing. It can block the connection to the computing system that is using the process or application to perform processing steps on computing system 102, or it can perform remediation in other ways. Alerting logic 270 can perform other steps as well, and this is indicated by block 220.

At some point, feedback/machine learning logic 154 detects feedback information indicative of the accuracy of the detected anomaly or anomalies detected by anomaly detection system 126. Receiving the feedback is indicated by block 224. Feedback/machine learning logic 154 then performs machine learning operations based upon the feedback to increase the accuracy of the stability identifying logic 150, the model generator logic 152 and/or the certificate-specific usage models 160-162. Performing machine learning to increase accuracy of the anomaly detection is indicated by block 226 in the flow diagram of FIG. 2.

Figure 3:
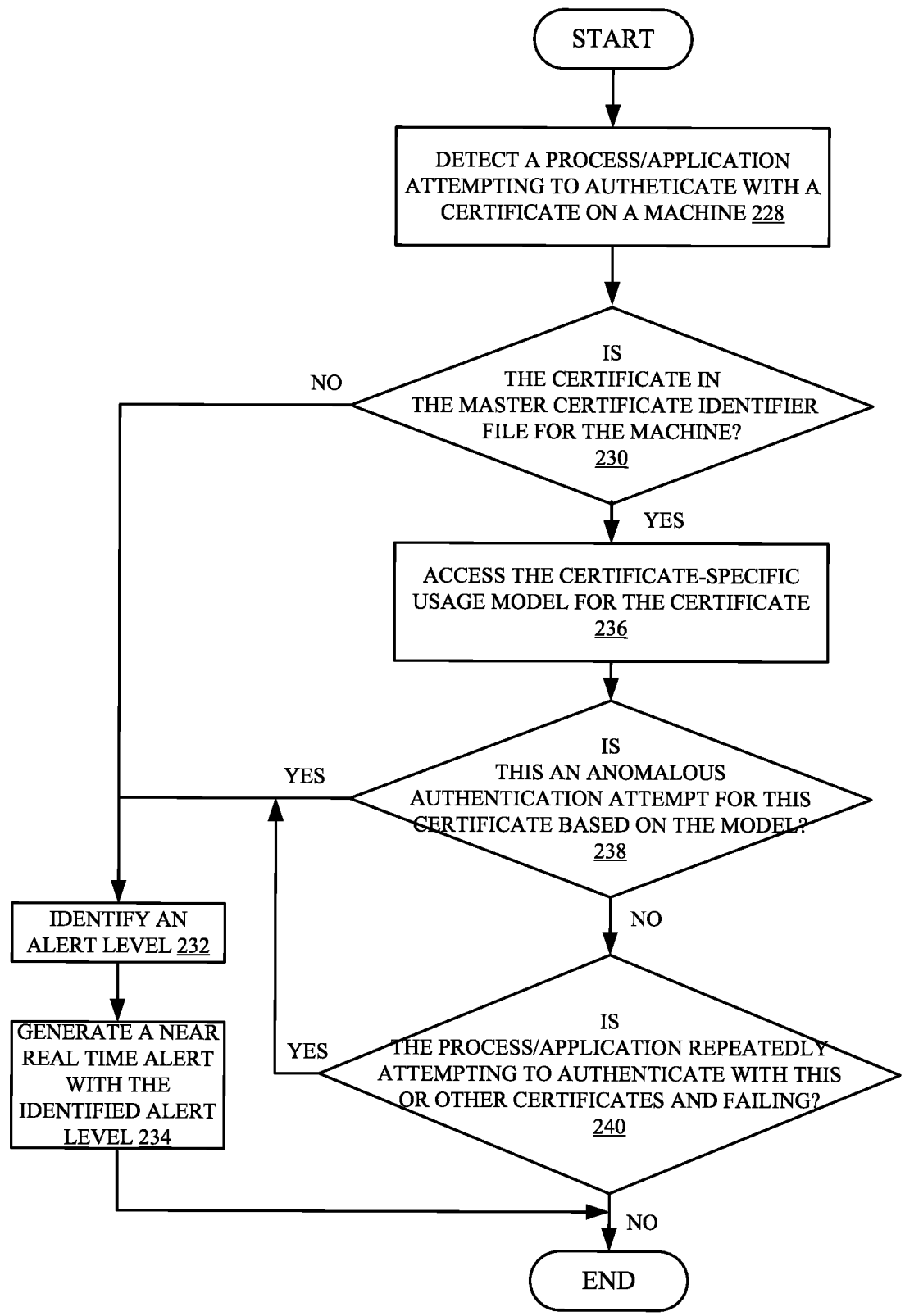
FIG. 3 is a flow diagram illustrating one example of the operation of the architecture illustrated in FIG. 1 in performing anomaly detection, in more detail.

FIG. 3 is a flow diagram illustrating one example of the operation of certificate usage detecting system 126, in more detail. In one example, model accessing and applying logic 164 detects that a process or application is attempting to authenticate with a certificate on the machine on which computing system 102 (or the portion of system 102 that is being accessed) is deployed. This is indicated by block 228 in the flow diagram of FIG. 3. In one example, it can receive a signal from process/application authentication logic 118 that identifies the particular application or process that is attempting to authenticate itself to computing system 102 with a particular certificate 130. New certificate identifying logic 166 then determines whether the certificate that is being used by the process or application is in the master certificate identifier file 134 for this machine. This is indicated by block 230. If not, then it provides a new certificate anomaly signal indicative of this to alerting logic 170 which identifies an alert level for this condition. This is indicated by block 232. It then generates a near real time alert with the identified alert level. This is indicated by block 234. As discussed above, the type of alert and the remedial actions that are taken can depend on the alert level, on the type of anomalous activity that spawned the alert, etc.

If, at block 230, new certificate identifying logic 166 finds that the certificate being used is, indeed, in the master certificate identifier file 134, then model accessing and applying logic 164 accesses the certificate-specific usage model 160-162 for this particular certificate. This is indicated by block 236 in the flow diagram of FIG. 3. It applies the model to determine whether this is an anomalous authentication attempt for this particular certificate. For instance, it determines, using the model, whether this particular process or application has used this particular certificate before to authenticate to computing system 102. Determining whether this is an anomalous authentication attempt is indicated by block 238 in the flow diagram of FIG. 3. If it is, then logic 164 generates an anomalous usage signal, indicative of this, to alerting logic 170. Processing again continues at block 232 where alerting logic 170 identifies an alert level and generates a near real time alert with the identified alert level, as indicated by block 234.

If, at block 238, model accessing and applying logic 164 determines that the certificate-specific usage model 160-162, for this particular certificate, indicates that this is not an anomalous usage, in that this particular application or process has used this particular certificate to authenticate (in the past) then authentication failure detection logic 168 determines whether the process or application is repeatedly attempting to authenticate, with this or other certificates 130, and failing. It can do this by receiving a signal from process/application authentication logic 118 indicating that the authentication has failed for this process or application, using this certificate. If there are repeated authentication failures for this process or application, then logic 168 generates an authentication failure anomaly signal indicative of this and provides it to alerting logic 170. Processing again returns to block 232 where alerting logic 170 receives the signal and identifies an alert level, and also to block 234 where it generates a near real time alert with the identified alert level. Determining whether there are repeated authentication failures is indicated by block 240. If there are not such failures, then certificate usage anomaly detection system 126 has not identified this usage as anomalous.

It can thus be seen that the present description provides greatly enhanced security for a computing system that uses it. It automatically detects certificate usage and generates models based upon that usage and then identifies anomalous usage from a potentially surreptitious actor, using the model. It generates an alerting signal, and thus allows remedial steps to be taken in near real time. This improves the computing system itself, in that its security is greatly enhanced.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
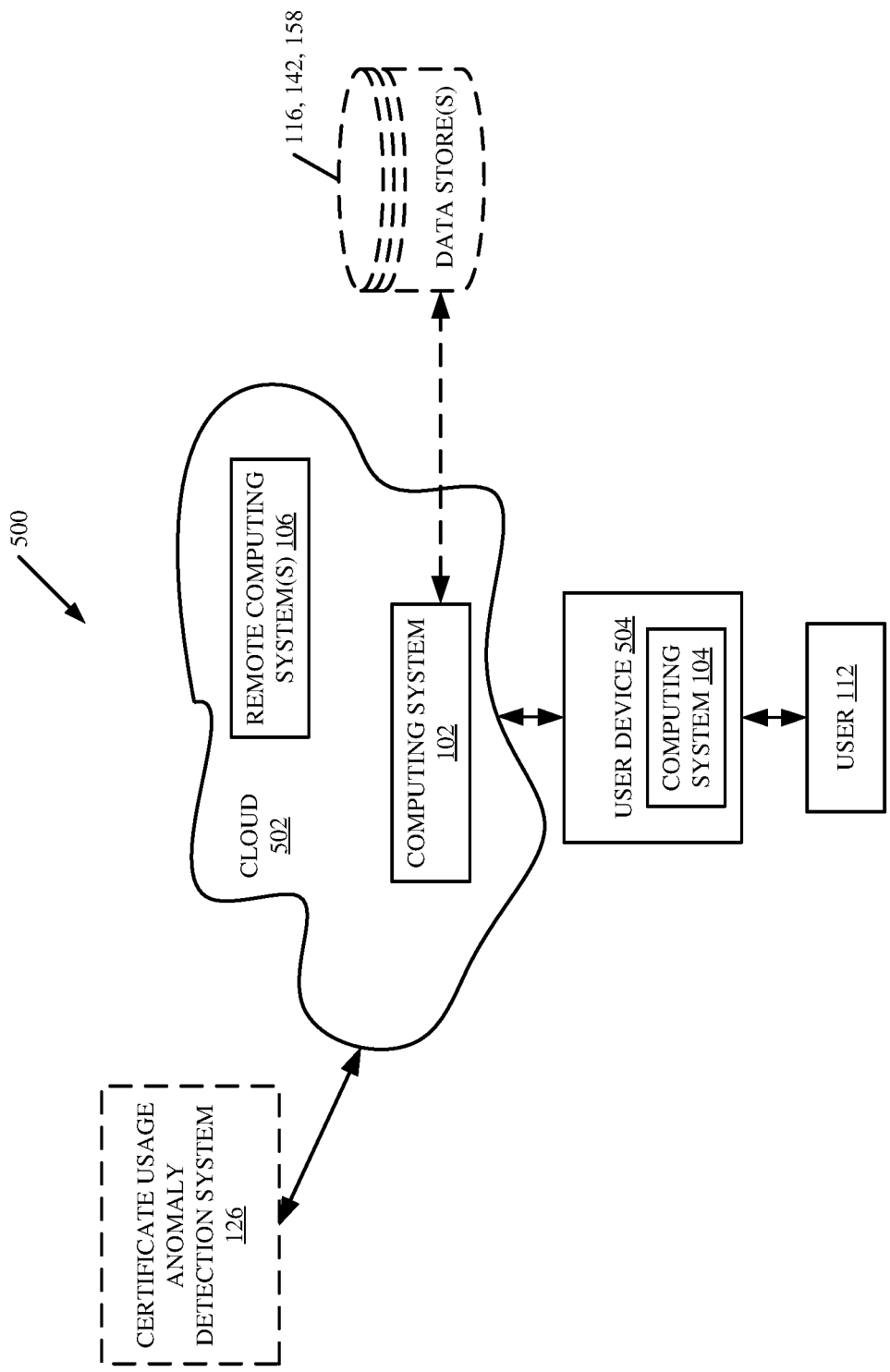
FIG. 4 shows one example of the architecture illustrated in FIG. 1, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that computing system 102 and remote systems 106 can be located in cloud 502 (which can be public, private, or a combination where portions are public while others are private). Therefore, user 112 uses can use device 504 that includes computing system 104 to access those systems through cloud 502.

FIG. 4 also depicts another example of a cloud architecture. FIG. 4 shows that it is also contemplated that some elements of computing system 102 can be disposed in cloud 502 while others are not. By way of example, data stores 116, 142, and 158 can be disposed outside of cloud 502, and accessed through cloud 502. In another example, certificate usage anomaly detection system 126, or other items, can be outside of cloud 502. Regardless of where they are located, they can be accessed directly, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
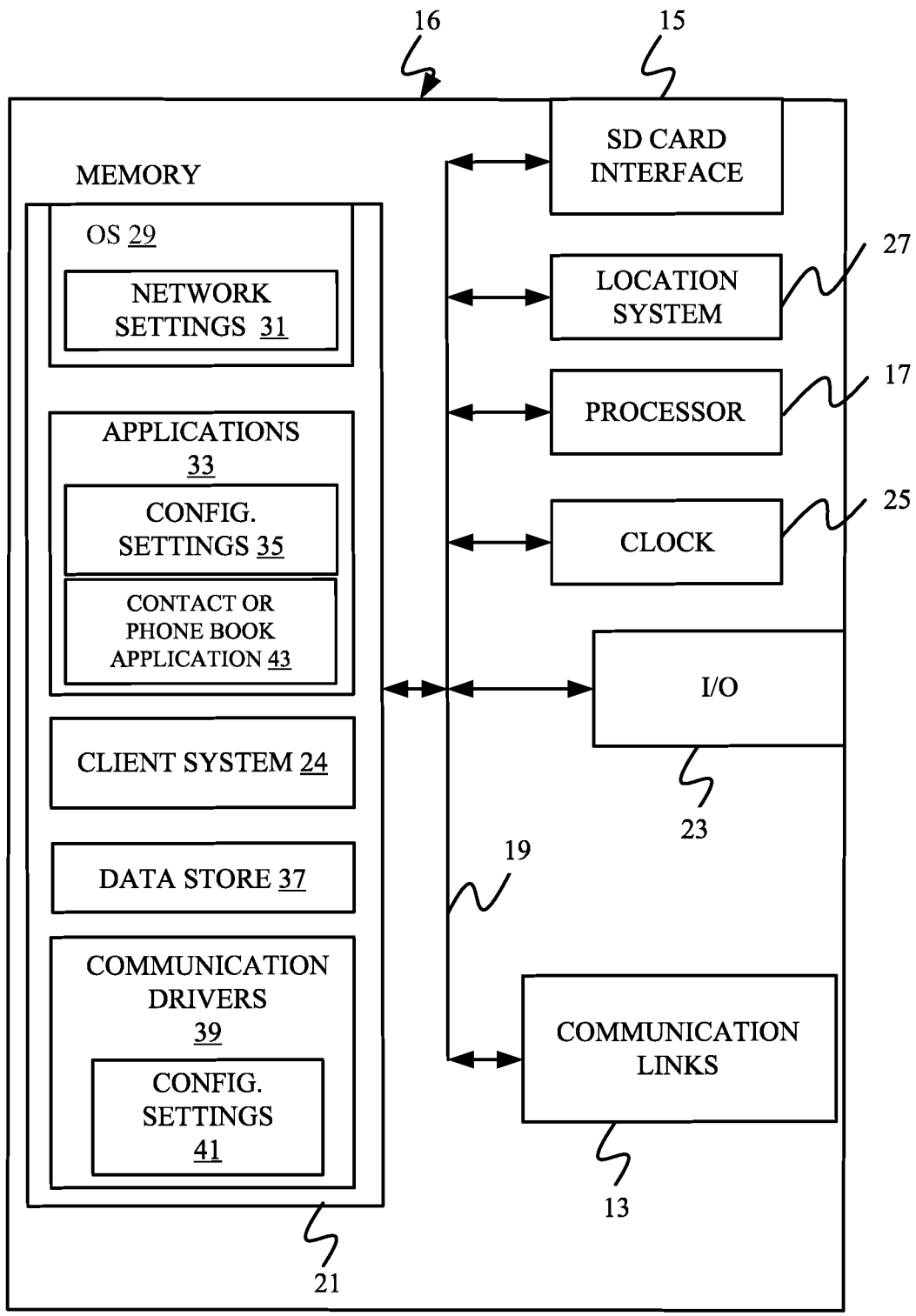
FIGS. 5-7 show examples of mobile devices that can be used in the architectures shown in the previous Figures.
Figure 6:
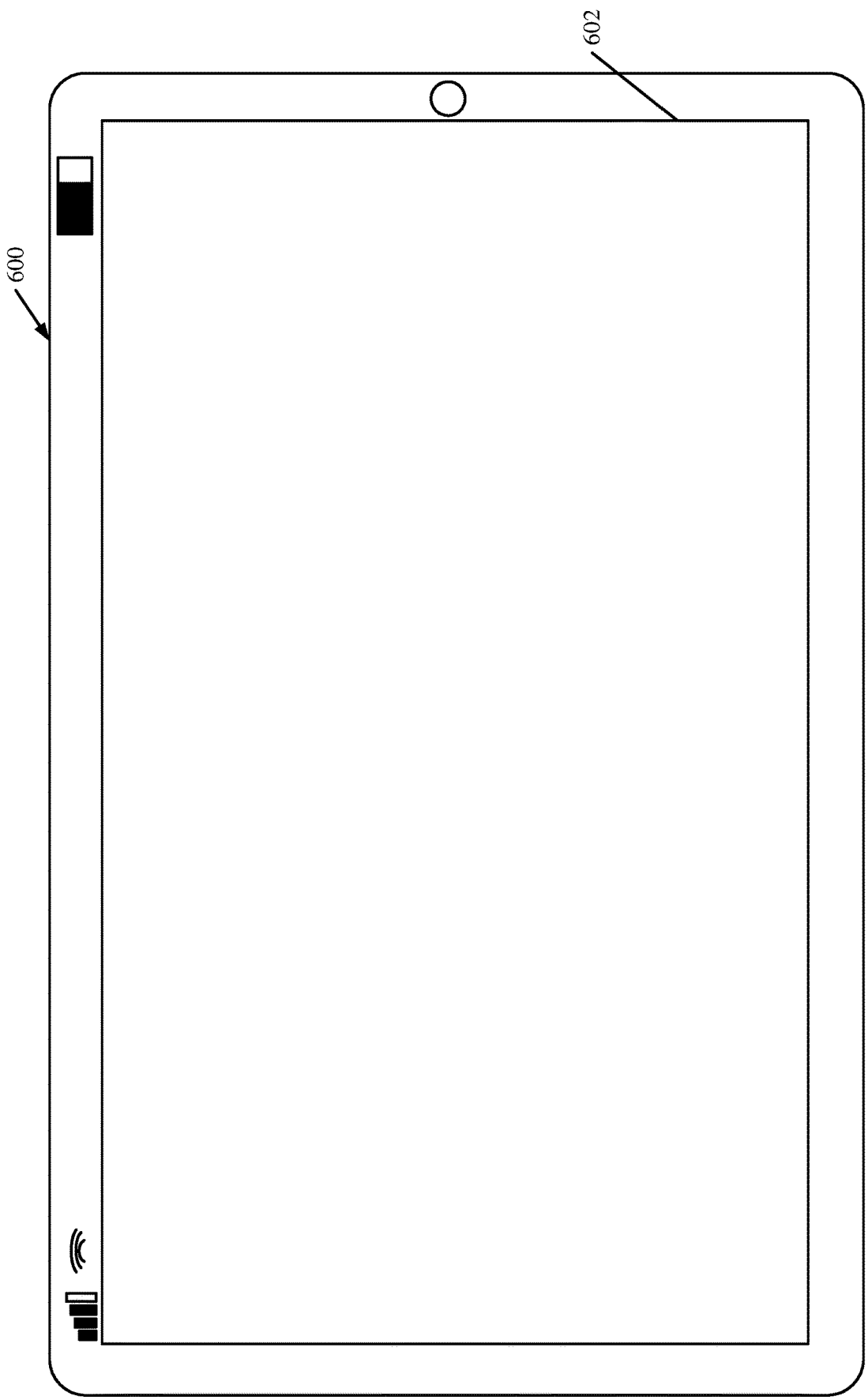
Figure 7:
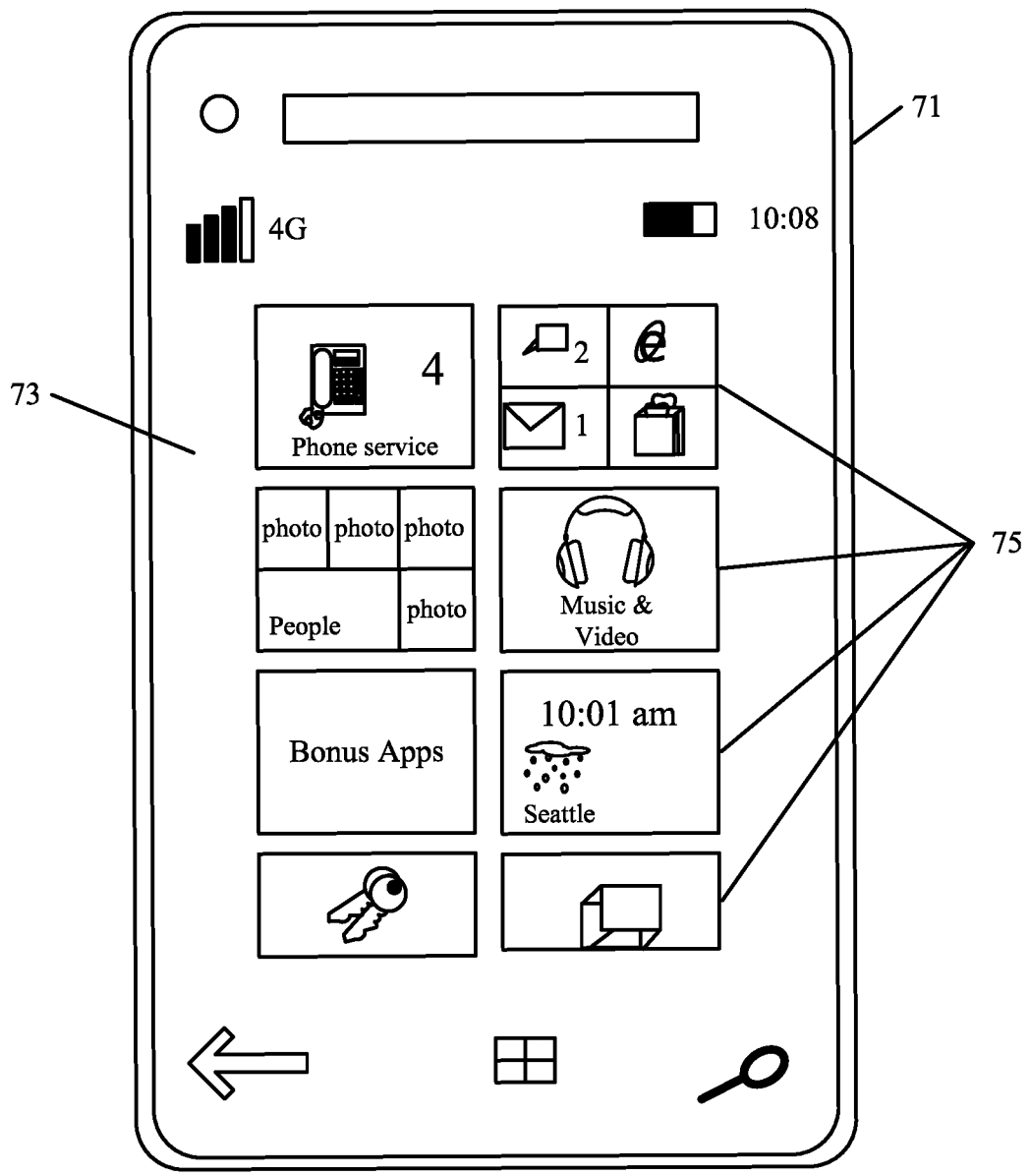

FIG. 5 is a simplified block diagram of one illustrative example of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components of computing system 104 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from previous FIGS. along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one example in which device 16 is a tablet computer 600. In FIG. 6, computer 600 is shown with a user interface display displayed on the display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
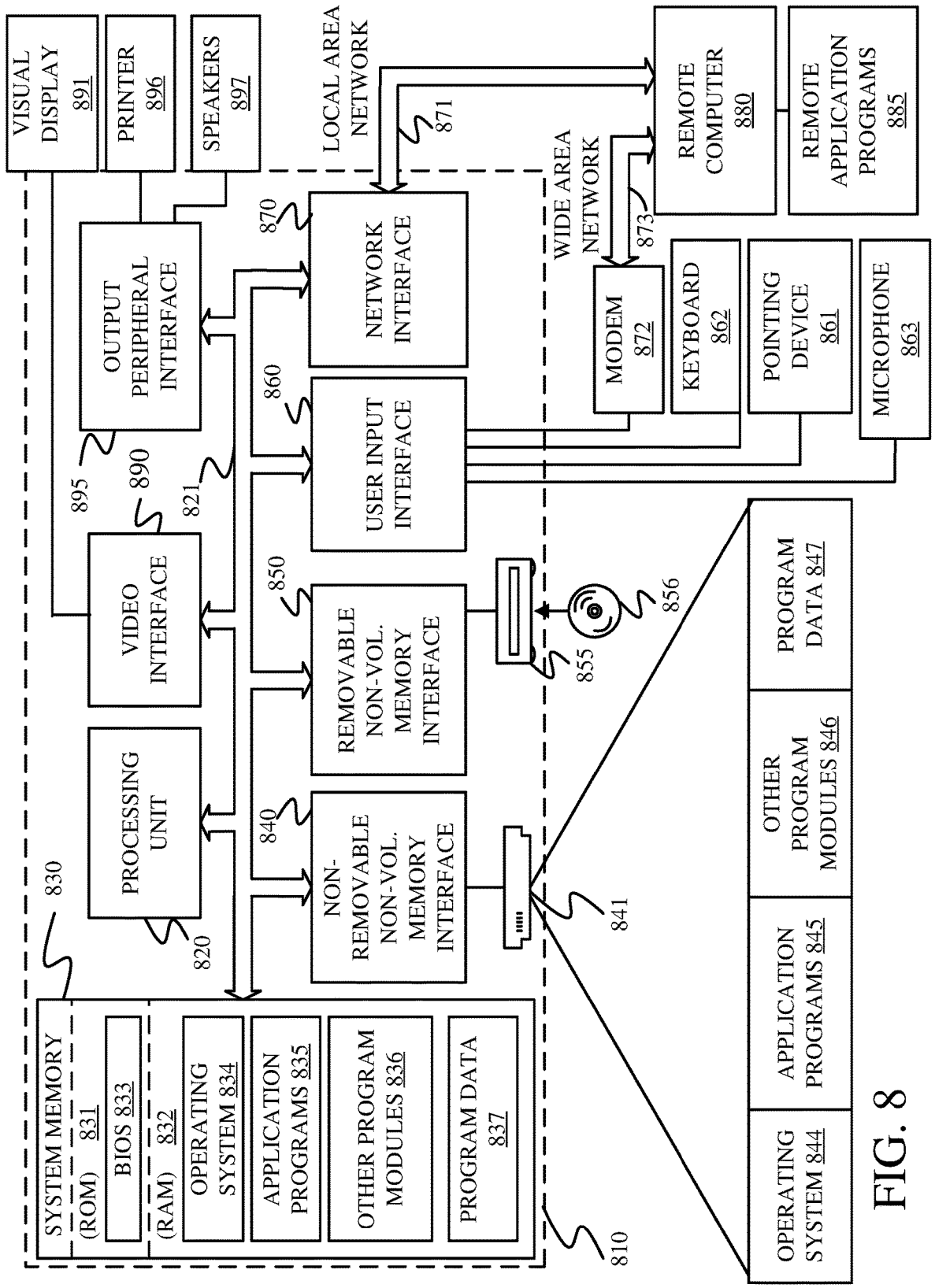
FIG. 8 is a block diagram showing one example of a computing environment that can be used in the architectures shown in the previous Figures.

FIG. 8 is one example of a computing environment in which architecture 100, or parts of it, (for example) can be deployed. With reference to FIG. 8, an example system for implementing some examples includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:
 a certificate usage tracking system that detects a set of processes that authenticate to the computing system using a certificate and generates process/certificate usage data identifying each of the processes in the set of processes and the certificate;
 a model generation system that generates a certificate-specific usage model representing the process/certificate usage data;
 a certificate usage anomaly detection system that detects that a given process is attempting to authenticate to the computing system using the certificate and accesses the certificate-specific usage model for the certificate to determine whether the attempted authentication is anomalous and, if so, generates a certificate usage anomaly signal indicative of the anomalous attempted authentication; and
 alerting logic that generates an alert control signal to generate a near real time alert based on the certificate usage anomaly signal.

Example 2 is the computing system of any or all previous examples wherein the certificate usage anomaly detection system comprises:
 new certificate identifying logic configured to access a master certificate identifier file that identifies authorized certificates for the computing system to determine whether the certificate is identified in the master certificate identifier file and if not, to generate a new certificate anomaly signal and provide it to the alerting logic.

Example 3 is the computing system of any or all previous examples wherein the certificate usage anomaly detection system comprises:
 authentication failure detection logic configured to detect repeated authentication failures by the process and generate an authentication failure anomaly signal and provide it to the alerting logic.

Example 4 is the computing system of any or all previous examples wherein the alerting logic is configured to generate a severity level for an anomaly based on the anomaly signal received.

Example 5 is the computing system of any or all previous examples wherein the alerting logic is configured to generate the alert control signal to generate a different near real time alert based on the severity level.

Example 6 is the computing system of any or all previous examples wherein the alerting logic is configured to execute an automated remediation process in response to the certificate usage anomaly signal.

Example 7 is the computing system of any or all previous examples wherein the certificate usage tracking system comprises:
 process identifying logic configured to identify, in near real time, each process in the set of processes, as it authenticates to the computing system; and
 certificate identifying logic configured to identify, in near real time, the certificate that each process in the set of processes uses to authenticate to the computing system.

Example 8 is the computing system of any or all previous examples wherein the certificate usage tracking system is configured to generate the process/certificate usage data by accessing a set of event logs that indicate which processes authenticated to the computing system using which certificates and to parse the set of event logs.

Example 9 is the computing system of any or all previous examples wherein the model generation system comprises:
 stability identifying logic configured to detect changes to the process/certificate usage data to determine a stability of the process/certificate usage data and to generate a stability signal indicative of the detected stability.

Example 10 is the computing system of any or all previous examples wherein the model generation system comprises:
 model generator logic configured to generate the certificate-specific usage model when the stability signal indicates a threshold level of stability.

Example 11 is the computing system of any or all previous examples wherein the model generation system comprises:
 feedback/machine learning logic configured to receive feedback data indicative of an accuracy of the certificate usage anomaly detection system and perform machine learning to improve accuracy of the certificate usage anomaly detection system.

Example 12 is a computer implemented method, comprising:
 detecting a set of processes that authenticate to the computing system using a certificate;
 generating process/certificate usage data identifying each of the processes in the set of processes and the certificate;
 generating a certificate-specific usage model representing the process/certificate usage data;
 detecting that a given process is attempting to authenticate to the computing system using the certificate;
 accessing the certificate-specific usage model for the certificate to determine whether the attempted authentication is anomalous;
 if so, generating a certificate usage anomaly signal indicative of the anomalous attempted authentication; and
 generating an alert control signal to generate a near real time alert based on the certificate usage anomaly signal.

Example 13 is the computer implemented method of any or all previous examples and further comprising:
 accessing a master certificate identifier file that identifies authorized certificates for the computing system to determine whether the certificate is identified in the master certificate identifier file;
 if not, to generating a new certificate anomaly signal; and
 providing the new certificate anomaly signal to the alerting logic.

Example 14 is the computer implemented method of any or all previous examples and further comprising:
 detecting repeated authentication failures by the given process;
 generating an authentication failure anomaly signal; and providing the authentication failure anomaly signal to the alerting logic.

Example 15 is the computer implemented method of any or all previous examples wherein generating an alert control signal comprises:
generating a severity level for an anomaly based on the anomaly signal received; and
generate the alert control signal to generate a different near real time alert based on the severity level.

Example 16 is the computer implemented method of any or all previous examples and further comprising:
executing an automated remediation process in response to the certificate usage anomaly signal.

Example 17 is the computer implemented method of any or all previous examples wherein generating process/certificate usage data comprises:
identifying, in near real time, each process in the set of processes, as it authenticates to the computing system; and
identifying, in near real time, the certificate that each process in the set of processes uses to authenticate to the computing system.

Example 18 is the computer implemented method of any or all previous examples wherein generating process/certificate usage data comprises:
accessing a set of event logs that indicate which processes authenticated to the computing system using which certificates; and
parsing the set of event logs.

Example 19 is the computer implemented method of any or all previous examples and further comprising:
receive feedback data indicative of an accuracy of the certificate usage anomaly detection system; and
performing machine learning to improve accuracy of the certificate usage anomaly detection system.

Example 20 is a computing system, comprising:
a processor;
a certificate usage tracking system that detects a set of processes that authenticate to the computing system using a certificate and generates process/certificate usage data identifying each of the processes in the set of processes and the certificate;
a model generation system that generates a certificate-specific usage model representing the process/certificate usage data;
a certificate usage anomaly detection system that detects that a given process is attempting to authenticate to the computing system using the certificate and accesses the certificate-specific usage model for the certificate to determine whether the attempted authentication is anomalous and, if so, generates a certificate usage anomaly signal indicative of the anomalous attempted authentication;
new certificate identifying logic configured to access a master certificate identifier file that identifies authorized certificates for the computing system to determine whether the certificate is identified in the master certificate identifier file and if not, to generate a new certificate anomaly signal and provide it to the alerting logic;
authentication failure detection logic configured to detect repeated authentication failures by the process and generate an authentication failure anomaly signal and provide it to the alerting logic; and
alerting logic that generates an alert ranking based on the certificate usage anomaly signal, the new certificate anomaly signal and the authentication failure anomaly signal, and an alert control signal, based on the alert ranking, to generate a near real time alert.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
generating certificate usage data that
identifies a process configured to authenticate to a computing system based on a certificate, and
represents historical certificate usage corresponding to the process;
detecting an authentication attempt by the process, the authentication attempt including the certificate;
determining that the authentication attempt is anomalous based on the certificate usage data; and
generating an alert control signal representing an alert based on the determining that the authentication attempt is anomalous.

2. The computer-implemented method of claim 1, wherein generating the certificate usage data comprises:
generating certificate-specific usage data that
identifies a plurality of processes, each process, in the plurality of processes, configured to authenticate to the computing system based on the certificate, and
represents historical certificate usage by each process in the plurality of processes.

3. The computer-implemented method of claim 2, and further comprising:
generating a stability signal indicating that the certificate-specific usage data has a threshold level of stability;
in response to the stability signal, generating a certificate-specific usage model that represents the certificate-specific usage data; and
determining that the authentication attempt is anomalous based on the certificate-specific usage model.

4. The computer-implemented method of claim 3, and further comprising:
determining that the certificate-specific usage data has a threshold level of stability based on a determination that the certificate-specific usage data has less than a threshold number of changes within a period of time.

5. The computer-implemented method of claim 2, and further comprising:
identifying, in near real time, each process in the plurality of processes, as the process authenticates to the computing system;
identifying, in near real time, the certificate that each process, in the plurality of processes, uses to authenticate to the computing system; and
executing an automated remediation process based on the determining that the authentication attempt is anomalous.

6. The computer-implemented method of claim 2, and further comprising:
generating the certificate-specific usage data based on one or more event logs that indicate which processes authenticated to the computing system using the certificate.

7. The computer-implemented method of claim 1, and further comprising:
accessing a master certificate identifier file that identifies authorized certificates for the computing system; and based on a determination that the certificate is not identified in the master certificate identifier file, generating a new certificate anomaly signal and providing the new certificate anomaly signal to an alerting system.

8. The computer-implemented method of claim 1, and further comprising:
   detecting repeated authentication failures associated with the process;
   generating an authentication failure anomaly signal representing the repeated authentication failures;
   generating a severity level associated with the authentication failure anomaly signal; and
   generating a near real time alert based on the severity level.

9. The computer-implemented method of claim 1, and further comprising:
   receiving feedback data indicative of an accuracy of anomaly detection based on the certificate usage data and performing machine learning to modify the anomaly detection based on the feedback data.

10. A computing system comprising:
    at least one processor; and
    memory storing instructions executable by the at least one processor, wherein the instructions, when executed, cause the computing system to:
      generate certificate usage data that
        identifies a process configured to authenticate to a computing system based on a certificate, and
        represents historical certificate usage corresponding to the process;
      detect an authentication attempt by the process, the authentication attempt including the certificate;
      determine that the authentication attempt is anomalous based on the certificate usage data; and
      generate an alert control signal representing an alert based on the determination that the authentication attempt is anomalous.

11. The computing system of claim 10, wherein the instructions, when executed, cause the computing system to:
    generate certificate-specific usage data that
      identifies a plurality of processes, each process configured to authenticate to the computing system based on the certificate, and
      represents historical certificate usage by each process in the plurality of processes.

12. The computing system of claim 11, wherein the instructions, when executed, cause the computing system to:
    generate a stability signal indicating that the certificate-specific usage data has a threshold level of stability;
    in response to the stability signal, generate a certificate-specific usage model that represents the certificate-specific usage data; and
    determine that the authentication attempt is anomalous based on the certificate-specific usage model.

13. The computing system of claim 12, wherein the instructions, when executed, cause the computing system to:
    determine that the certificate-specific usage data has a threshold level of stability based on a determination that the certificate-specific usage data has less than a threshold number of changes within a period of time.

14. The computing system of claim 11, wherein the instructions, when executed, cause the computing system to:
    identify, in near real time, each process in the plurality of processes, as the process authenticates to the computing system;
    identify, in near real time, the certificate that each process, in the plurality of processes, uses to authenticate to the computing system; and
    execute an automated remediation process based on the determination that the authentication attempt is anomalous.

15. The computing system of claim 11, wherein the instructions, when executed, cause the computing system to:
    generate the certificate-specific usage data based on one or more event logs that indicate which processes authenticated to the computing system using the certificate.

16. The computing system of claim 10, wherein the instructions, when executed, cause the computing system to:
    detect repeated authentication failures associated with the process;
    generate an authentication failure anomaly signal representing the repeated authentication failures;
    generate a severity level associated with the authentication failure anomaly signal; and
    generate a near real time alert based on the severity level.

17. The computing system of claim 10 wherein the instructions, when executed, cause the computing system to:
    receive feedback data indicative of an accuracy of anomaly detection based on the certificate usage data and perform machine learning to modify the anomaly detection based on the feedback data.

18. A computing system comprising:
    at least one processor; and
    memory storing instructions executable by the at least one processor, wherein the instructions, when executed, implement:
      a certificate usage tracking system configured to:
        generate certificate usage data that
          identifies a process configured to authenticate to a computing system based on a certificate, and
          represents historical certificate usage corresponding to the process;
      a certificate usage anomaly detection system configured to:
        detect an authentication attempt by the process, the authentication attempt including the certificate;
        determine that the authentication attempt is anomalous based on the certificate usage data; and
      an alert generation system configured to generate an alert control signal representing an alert based on the determination that the authentication attempt is anomalous.

19. The computing system of claim 18, wherein the certificate usage tracking system is configured to:
    generate certificate-specific usage data that
      identifies a plurality of processes, each process, in the plurality of processes, configured to authenticate to the computing system based on the certificate, and
      represents historical certificate usage by each process in the plurality of processes.

20. The computing system of claim 19, wherein the instructions implement:
    stability identifying logic configured to:
      determine that the certificate-specific usage data has a threshold level of stability based on a determination that the certificate-specific usage data has less than a threshold number of changes within a period of time;
      generate a stability signal indicating that the determination that the certificate-specific usage data has the threshold level of stability; and
    a model generation system configured to:

in response to the stability signal, generate a certificate-specific usage model that represents the usage data.

* * * * *